US010068575B2

(12) United States Patent
Fujii et al.

(10) Patent No.: US 10,068,575 B2
(45) Date of Patent: Sep. 4, 2018

(54) INFORMATION NOTIFICATION SUPPORTING DEVICE, INFORMATION NOTIFICATION SUPPORTING METHOD, AND COMPUTER PROGRAM PRODUCT

(71) Applicant: KABUSHIKI KAISHA TOSHIBA, Minato-ku, Tokyo (JP)

(72) Inventors: Hiroko Fujii, Tokyo (JP); Masaru Suzuki, Kanagawa (JP); Kazuo Sumita, Kanagawa (JP); Masaru Sakai, Tokyo (JP); Masahide Ariu, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 669 days.

(21) Appl. No.: 13/729,687

(22) Filed: Dec. 28, 2012

(65) Prior Publication Data
US 2013/0218553 A1    Aug. 22, 2013

(30) Foreign Application Priority Data

Feb. 16, 2012   (JP) .................................. 2012-031752

(51) Int. Cl.
G06F 17/27    (2006.01)
G10L 15/22    (2006.01)
(Continued)

(52) U.S. Cl.
CPC ............ *G10L 15/222* (2013.01); *G10L 15/26* (2013.01); *G10L 25/87* (2013.01)

(58) Field of Classification Search
USPC ............... 704/9, 201, 220, 270.1; 379/88.22, 379/209.01, 265.01, 201.01; 709/238,
(Continued)

(56) References Cited

U.S. PATENT DOCUMENTS 7,962,342 B1*  6/2011 Coughlan ............... G10L 15/22
                                                    379/201.01
8,831,677 B2*  9/2014 Villa-Real ............... H04M 1/66
                                                    455/552.1
(Continued)

FOREIGN PATENT DOCUMENTS

JP         62-040577      2/1987
JP         08-146989      6/1996
(Continued)

OTHER PUBLICATIONS

Japanese Office Action for Japanese Patent Application No. 2012-031752 dated Jan. 6, 2015.
(Continued)

*Primary Examiner* — Neeraj Sharma
(74) *Attorney, Agent, or Firm* — Amin, Turocy & Watson LLP

(57) ABSTRACT

According to an embodiment, an information notification supporting device includes an analyzer configured to analyze an input voice so as to identify voice information indicating information related to speech; a storage unit configured to store therein a history of the voice information; an output controller configured to determine, using the history of the voice information, whether a user is able to listen to a message of which the user should be notified; and an output unit configured to output the message when it is determined that the user is in a state in which the user is able to listen to the message.

16 Claims, 7 Drawing Sheets

(51) Int. Cl.
   *G10L 15/26* (2006.01)
   *G10L 25/87* (2013.01)
   *G10L 21/00* (2013.01)
   *G10L 15/00* (2013.01)
   *H04M 1/00* (2006.01)
   *H04M 3/42* (2006.01)
   *H04M 1/64* (2006.01)
   *G06F 15/173* (2006.01)
   *G06F 15/16* (2006.01)

(58) Field of Classification Search
   USPC .............. 709/206, 217; 455/414.1; 235/375; 715/700, 710
   See application file for complete search history.

(56) References Cited

U.S. PATENT DOCUMENTS

| | | | | |
|---|---|---|---|---|
| 9,710,765 | B2* | 7/2017 | Richter | G06Q 10/00 |
| 2002/0080156 | A1* | 6/2002 | Abbott | G06F 1/163 |
| | | | | 715/700 |
| 2002/0178007 | A1* | 11/2002 | Slotznick | G09B 5/06 |
| | | | | 704/270.1 |
| 2003/0046421 | A1* | 3/2003 | Horvitz et al. | 709/238 |
| 2004/0061716 | A1* | 4/2004 | Cheung | G06F 9/542 |
| | | | | 715/710 |
| 2006/0210034 | A1* | 9/2006 | Beadle | G06Q 10/107 |
| | | | | 379/88.22 |
| 2007/0011367 | A1* | 1/2007 | Scott | G06Q 10/10 |
| | | | | 710/48 |
| 2007/0112925 | A1* | 5/2007 | Malik | 709/206 |
| 2007/0280460 | A1* | 12/2007 | Harris et al. | 379/201.01 |
| 2009/0117942 | A1* | 5/2009 | Boningue | H04M 1/72547 |
| | | | | 455/564 |
| 2009/0125380 | A1* | 5/2009 | Otto | G06Q 10/087 |
| | | | | 705/7.29 |
| 2009/0271486 | A1* | 10/2009 | Ligh | G06F 3/04886 |
| | | | | 709/206 |
| 2011/0119053 | A1* | 5/2011 | Kuo et al. | 704/201 |
| 2012/0042039 | A1* | 2/2012 | Mark | G06F 19/327 |
| | | | | 709/217 |
| 2012/0199643 | A1* | 8/2012 | Minnick | G06F 17/30879 |
| | | | | 235/375 |
| 2012/0278408 | A1* | 11/2012 | Seferian | G06Q 10/1095 |
| | | | | 709/206 |
| 2013/0007146 | A1* | 1/2013 | Maynard | G06Q 10/107 |
| | | | | 709/206 |
| 2013/0035078 | A1* | 2/2013 | Skog | G06Q 30/02 |
| | | | | 455/414.1 |

FOREIGN PATENT DOCUMENTS

| | | |
|---|---|---|
| JP | 10-021049 | 1/1998 |
| JP | 2002-082682 | 3/2002 |
| JP | 2002-156241 | 5/2002 |
| JP | 2006-331251 | 12/2006 |
| JP | 2009-020672 | 1/2009 |
| JP | 2010-128099 | 6/2010 |
| JP | 2010-152119 | 7/2010 |

OTHER PUBLICATIONS

Office Action of Notice of Rejection for Japanese Patent Application No. 2012-031752 dated Apr. 22, 2014, 5 pgs.

Shinichi Yataka. "An Audio Information Presentation Method Considering Subjective Volume for Wearable Computing", The Special Interest Group Technical Reports of IPSJ, Japan, Information Processing Society of Japan, Apr. 15, 2011, 2011-UBI-29 (38), pp. 1-8.

* cited by examiner

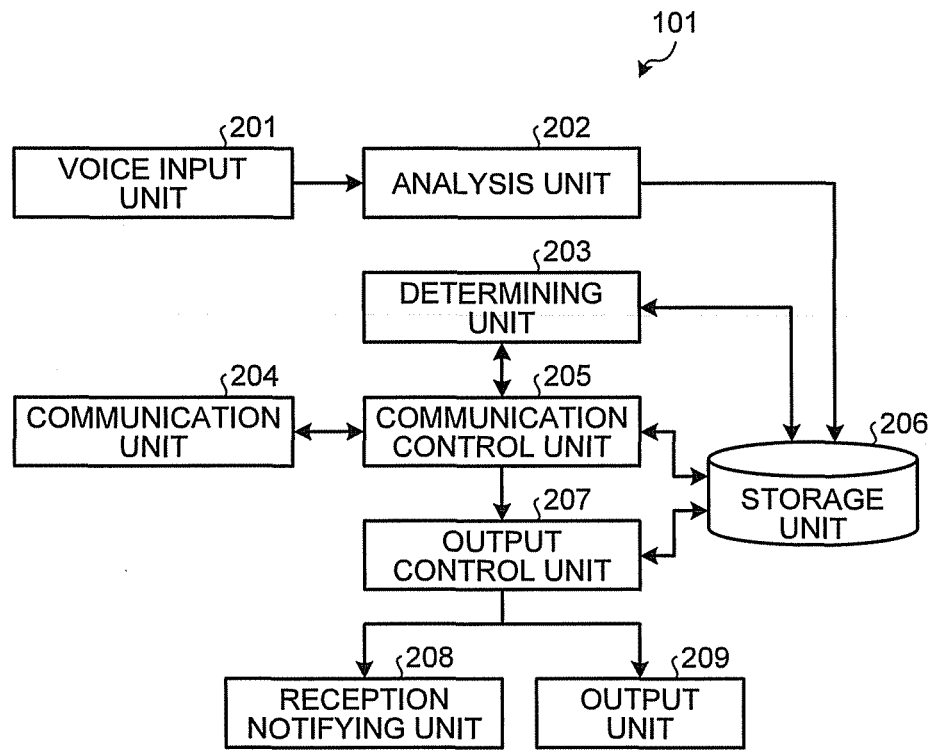
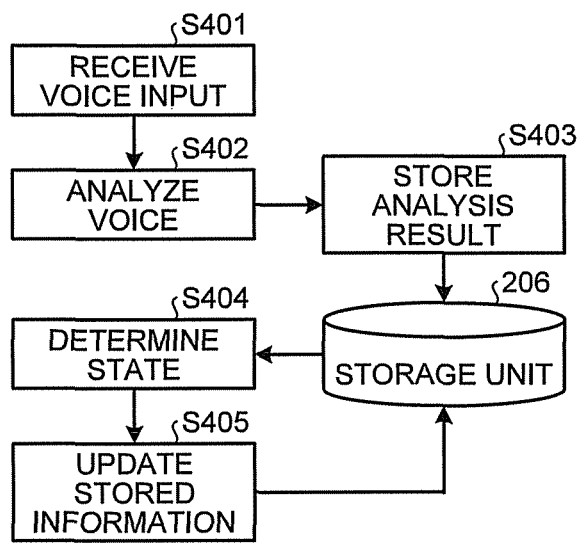

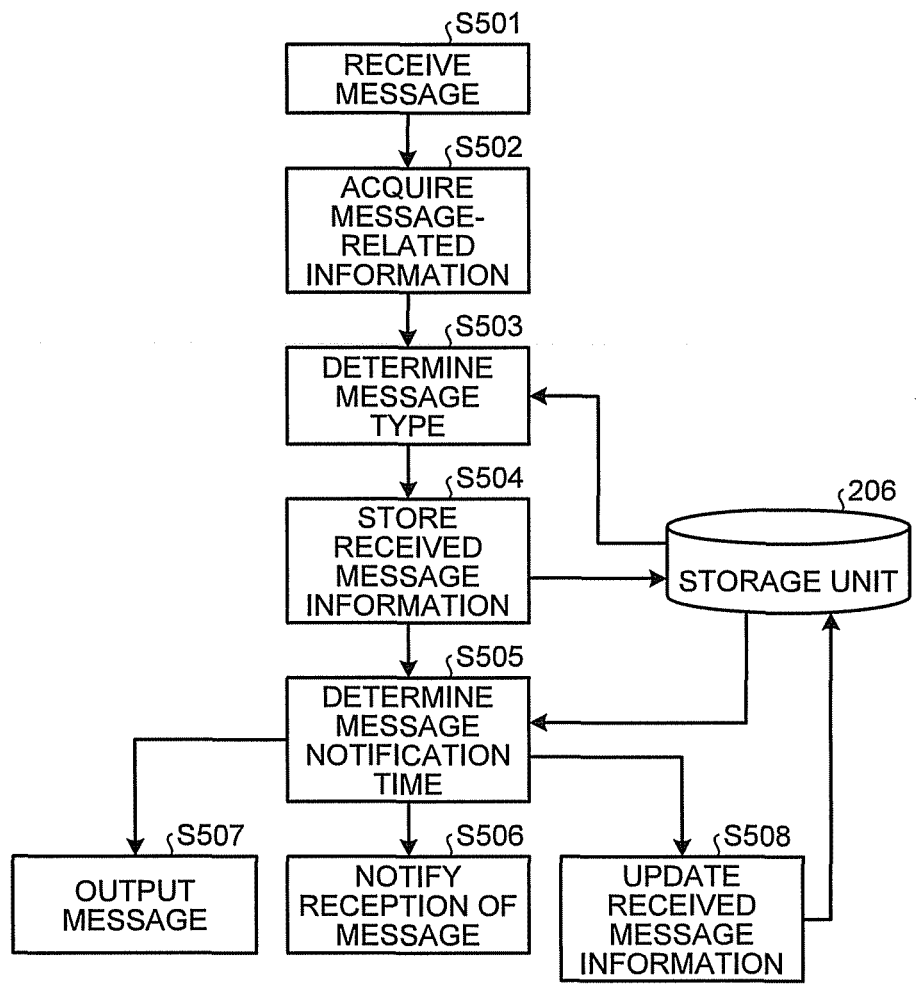

FIG.5

USER A: LONG TIME NO SEE
USER B: DID YOU TAKE A TRIP TO BALI FOR HOLIDAYS?
USER A: YEAH, I.....
...
(MESSAGE RECEPTION NOTIFICATION SOUND) BEEPING SOUND
(MESSAGE OUTPUT): NEXT MEETING IS ABOUT TO START
USER A: SORRY, THE NEXT MEETING IS ABOUT TO START. LET'S TALK ABOUT THIS NEXT TIME.

FIG.6

| SPEECH ID | SPEECH START TIME | SPEECH TIME | SPEAKER ID | |
|---|---|---|---|---|
| 1 | 2011/09/08 09:40:50 | 00:00:05 | 0001 | ← UNIT INFORMATION (FIRST ROW) |
| 2 | 2011/09/08 09:40:57 | 00:00:12 | 0002 | ← UNIT INFORMATION (SECOND ROW) |
| 3 | 2011/09/08 09:41:15 | 00:00:15 | 0001 | ← UNIT INFORMATION (THIRD ROW) |
| ... | ... | ... | ... | |

| MESSAGE TYPE ID | DEGREE OF IMPORTANCE OF MESSAGE | DEGREE OF ASSOCIATION BETWEEN CURRENT STATE AND RECEIVED MESSAGE | NOTIFICATION SOUND TYPE | MESSAGE OUTPUT TIMING |
|---|---|---|---|---|
| 1 | HIGH | PRESENT | 1 | PRIORITY |
| 3 | MEDIUM | PRESENT | 2 | NORMAL |
| 5 | LOW | PRESENT | 3 | NORMAL |
| 2 | HIGH | ABSENT | 4 | PRIORITY |
| 4 | MEDIUM | ABSENT | 5 | NORMAL |
| 6 | LOW | ABSENT | 6 | DELAY |

FIG.9

| MESSAGE ID | REQUEST TRANSMITTER | REQUEST TRANSMISSION TIME | RECEPTION TIME | MESSAGE TYPE ID | CONTENT OF MESSAGE | RECEPTION NOTIFICATION | CONTENT NOTIFICATION |
|---|---|---|---|---|---|---|---|
| 0003 | SYSTEM | — | 2011/09/08 14:55 | 4 | NEXT MEETING IS ABOUT TO START | OK | OK |
| 0001 | SYSTEM | — | 2011/09/08 13:15 | 6 | MAIL HAS BEEN RECEIVED | OK | OK |
| 0002 | SYSTEM | — | 2011/09/08 14:20 | 6 | SALE OF SHARES HAS BEEN ESTABLISHED | OK | |

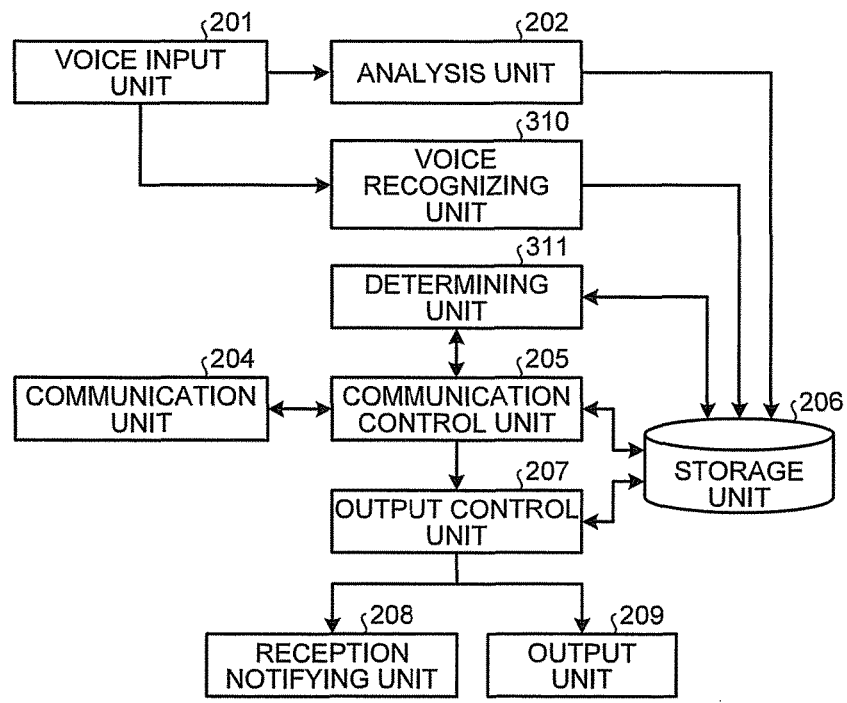

| USER REQUEST TRANSMITTER | TIME WHEN USER REQUEST IS MADE | ASSOCIATION BETWEEN CONTENT OF CURRENT CONVERSATION AND RECEIVED MESSAGE | DEGREE OF ASSOCIATION BETWEEN CURRENT STATE AND RECEIVED MESSAGE |
|---|---|---|---|
| USER | CURRENT STATE | PRESENT | PRESENT |
| | | ABSENT | ABSENT |
| | PREVIOUS STATE | PRESENT | PRESENT |
| | | ABSENT | ABSENT |
| SYSTEM | CURRENT STATE | PRESENT | PRESENT |
| | | ABSENT | ABSENT |
| | PREVIOUS STATE | PRESENT | PRESENT |
| | | ABSENT | ABSENT |

INFORMATION NOTIFICATION SUPPORTING DEVICE, INFORMATION NOTIFICATION SUPPORTING METHOD, AND COMPUTER PROGRAM PRODUCT

CROSS-REFERENCE TO RELATED APPLICATION(S)

This application is based upon and claims the benefit of priority from Japanese Patent Application No. 2012-031752, filed on Feb. 16, 2012; the entire contents of which are incorporated herein by reference.

FIELD

Embodiments described herein relate generally to an information notification supporting device, an information notification supporting method, and a computer program product.

BACKGROUND

In recent years, the spreading of portable terminals, such as smart phones, has made it possible to use services on the network, such as an information search service and a ticket reservation service at any time. In addition, with an improvement in the performance of voice recognition technology and voice synthesis technology, electronic apparatuses, such as PCs (Personal Computers) or portable terminals, with a voice input function or a voice output function have been actively developed. For example, an input and output device, such as a headset capable of performing both an input operation using voice recognition and an output operation using voice synthesis, can be used to issue a request for processing to an electronic apparatus, such as a portable terminal or a PC, or to listen to the result of the processing even at the position separated from the electronic apparatus. Therefore, the user can obtain necessary information even when the user has no hands free or even when the user performs another operation.

However, a situation in which the user can perform an operation at the position away from the electronic apparatus which performs the actual processing is convenient for the user, but it is difficult to know the time when the message is notified by the system (electronic apparatus). Therefore, for example, during conversation, a response, such as a notice of the next meeting or the confirmation of the schedule, to the request from the user may return. When a voice during conversation (the voice of the user or the voice of the conversational partner) overlaps the message from the system ("system response"), the conversation is interrupted and it is difficult for the user to listen to the system response. Therefore, it is necessary to control the output time of the system response such that the conversation does not overlap the system response.

For example, JP-A 2009-20672 (KOKAI) discloses a technique in which a server apparatus which checks the work state of each user in real time presents the real-time work state of each user such that each user can check the state of a communication partner. However, this technique presents only the real-time work state of each user, but does not control the time when a message is output. In addition, for example, JP-A 2010-152119 (KOKAI) discloses a technique which performs control such that the speech of the user does not overlap the system response when the user communicates with the system. In this technique, when the user makes a speech, the system classifies the intention of the speech of the user and selects response candidates corresponding to the classified intention of the speech. A waiting time until a message corresponding to an answer sentence is output is set to each response candidate and the message corresponding to the answer sentence is output only when the user makes a new speech for the waiting time. However, in this technique, the message corresponding to the answer sentence is output only when the waiting time has elapsed, regardless of the current state of the user. Therefore, in some cases, the output time of the message is not appropriate.

In the above-mentioned techniques, it is difficult to notify the user of the message at an appropriate time.

BRIEF DESCRIPTION OF THE DRAWINGS

FIG. 2 is a block diagram illustrating an example of the functional structure of an information notification supporting device according to the first embodiment;

FIG. 3 is a diagram illustrating an example of the operation of the information notification supporting device according to the first embodiment;

FIG. 4 is a diagram illustrating an example of the operation of the information notification supporting device according to the first embodiment;

FIG. 5 is a diagram illustrating an example of user conversation in the first embodiment;

FIG. 6 is a diagram illustrating an example of voice input history information according to the first embodiment;

FIG. 9 is a diagram illustrating an example of a received message list according to the first embodiment;

FIG. 10 is a block diagram illustrating an example of the functional structure of an information notification supporting device according to a second embodiment; and FIG. 11 is a diagram illustrating an example of a determination method performed by a determining unit according to the second embodiment.

DETAILED DESCRIPTION

According to an embodiment, an information notification supporting device includes an analyzer configured to analyze an input voice so as to identify voice information indicating information related to speech; a storage unit configured to store therein a history of the voice information; an output controller configured to determine, using the history of the voice information, whether a user is able to listen to a message of which the user should be notified; and an output unit configured to output the message when it is determined that the user is in a state in which the user is able to listen to the message.

Hereinafter, various embodiments will be described in detail with reference to the accompanying drawings.

In the following embodiments, a system is considered in which information providing services are provided to a user through an information notification supporting device that is attached to the ear of the user and cooperates with a remote system body. In this system, for example, it is possible to notify the user of a message indicating schedule information and also notify the user of a message indicating the processing result of a voice-based request from the user.

First Embodiment

Figure 1:
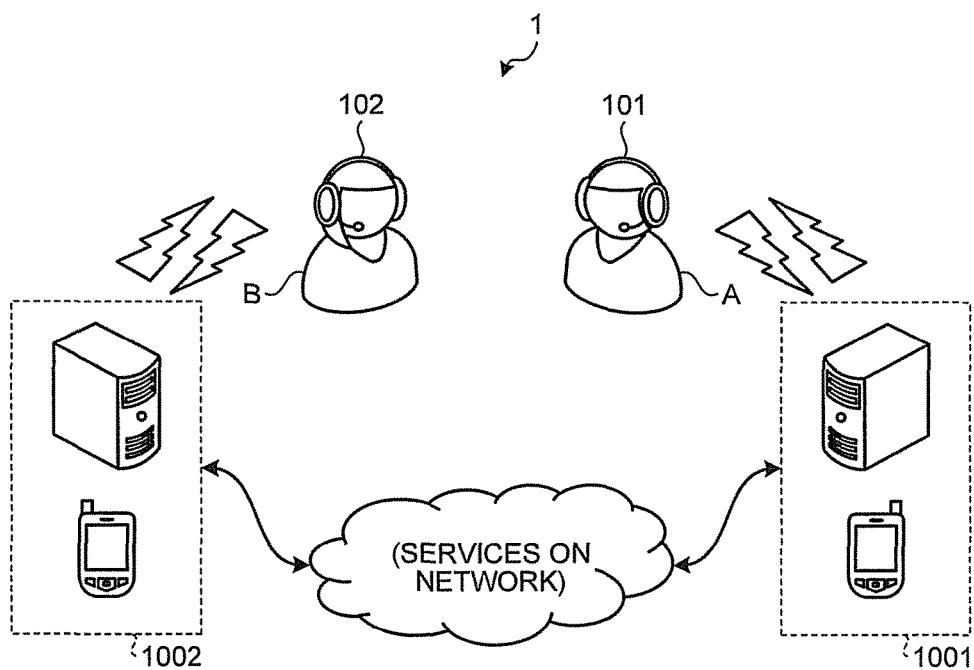
FIG. 1 is a block diagram illustrating an example of the structure of a system according to a first embodiment.

FIG. 1 is a block diagram illustrating an example of the schematic structure of a system 1 according to a first embodiment. As illustrated in FIG. 1, the system 1 includes an information notification supporting device 101 that can be attached to the ear of a user A, a system body 1001 that is connected to the information notification supporting device 101, an information notification supporting device 102 that can be attached to the ear of a user B, and a system body 1002 that is connected to the information notification supporting device 102. In the example illustrated in FIG. 1, two information notification supporting devices and two system bodies are included in the system 1. However, the embodiment is not limited thereto. For example, any number of information notification supporting devices and any number of system bodies may be included in the system 1. The following description is focused on the information notification supporting device 101 that can be attached to the ear of the user A and the system body 1001 that is connected to the information notification supporting device 101. However, the information notification supporting device 102 that can be attached to the ear of the user B and the system body 1002 that is connected to the information notification supporting device 102 have the same structure as the information notification supporting device 101 and the system body 1001.

The information notification supporting device 101 is connected to the remote system body 1001 through, for example, a wireless LAN. The system body 1001 may be, for example, a PC (Personal Computer), a smart phone, or the like. The system body 1001 can provide various kinds of services, such as a search service or a ticket reservation service, through, for example, the Internet or the like. The information notification supporting device 101 notifies the user A of the message received from the system body 1001. That is, the user A can listen to the message from the system body 1001 through the information notification supporting device 101. For example, before the next meeting starts, the user A can listen to a message saying that the meeting is about to start. In addition, the user A may listen to a message indicating the result of the request for the system body 1001. For example, when the user A requests to search for the meaning of an unknown word, the user A may listen to the search result.

FIG. 2 is a block diagram illustrating an example of the functional structure of the information notification supporting device 101. As illustrated in FIG. 2, the information notification supporting device 101 includes a voice input unit 201, an analysis unit 202, a determining unit 203, a communication unit 204, a communication control unit 205, a storage unit 206, an output control unit 207, a reception notifying unit 208, and an output unit 209.

The voice input unit 201 receives a voice around the user A which is acquired by, for example, a microphone or the like. The voice input unit 201 receives the voice of another user B around the user A as an input, in addition to the voice of the user A wearing the information notification supporting device 101.

The analysis unit 202 analyzes the voice (input voice) received by the voice input unit 201. More specifically, the analysis unit 202 analyzes the time when the voice input unit 201 receives the voice and whether the voice is of the user A. Then, the analysis unit 202 registers voice information indicating the analysis result in the storage unit 206. The voice information includes at least a speech start time indicating the time at which a speech starts and a speech time indicating the time period for which a speech is made, which will be described below.

The determining unit 203 determines the current state of the user on the basis of the voice information stored in the storage unit 206. Then, the determining unit 203 registers state information indicating the determination result in the storage unit 206, which will be described in detail below.

The communication unit 204 communicates with the system body 1001. For example, the communication unit 204 may transmit information indicating a user request for the system body 1001 to the system body 1001 and receive a message from the system body 1001.

The communication control unit 205 controls the transmission and reception of information performed by the communication unit 204. For example, the communication control unit 205 may perform analysis of, for example, a message issuer, the time at which the message is issued, the content of the message, and the like.

The storage unit 206 stores therein various kinds of information. More specifically, the storage unit 206 stores therein voice information indicating the analysis result by the analysis unit 202 and state information indicating the determination result by the determining unit 203. In addition to the voice information and the state information, the storage unit 206 may store therein the schedule information of the user A or the position information of the user A which is obtained using, for example, a GPS, or it may store therein the result of communication between the information notification supporting device 101 and the system body 1001 together with time information.

The output control unit 207 determines the timing of notifying the user A of the message received by the communication unit 204 from the system body 1001. When the communication unit 204 receives the message from the system body 1001, the output control unit 207 determines whether the user is in a state in which the user is able to listen to the message from the system body 1001, on the basis of the state information stored in the storage unit 206, which will be described in detail below. Then, when it is determined that the user is in the state in which the user is able to listen to the message from the system body 1001, the output control unit 207 causes the output unit 209 to output the message received by the communication unit 204. Meanwhile, when it is determined that the user is not in the state in which the user is able to listen to the message from the system body 1001, the output control unit 207 cases the reception notifying unit 208 to output a notification sound indicating the reception of the message and then controls the timing of outputting the content of the message according to the degree of association between the received message and the current state of the user or the degree of importance of the message.

The reception notifying unit 208 outputs a notification sound indicating the reception of the message under the control of the output control unit 207. The pattern of the notification sound output by the reception notifying unit 208 varies depending on the degree of association between the received message and the current state of the user or the degree of importance of the message.

The output unit 209 outputs a voice indicating the content of the message. More specifically, the output unit 209 outputs a voice indicating the content of the message, which is transmitted from the system body 1001 and is then received by the communication unit 204, to the user A under the control of the output control unit 207.

Next, an example of the operation of the information notification supporting device 101 according to the first embodiment will be described with reference to FIGS. 3 and 4. FIG. 3 is a diagram illustrating an example of the operation when the information notification supporting device 101 receives an input voice and when the information notification supporting device 101 determines the current state of the user A. As illustrated in FIG. 3, first, in a voice input receiving step S401, the voice input unit 201 receives the input of a voice around the user A. For example, when the user A and the user B talk with each other as illustrated in FIG. 5, the voice input unit 201 receives both "Long time no see" and "Yeah, I . . . " spoken by the user A and "Did you take a trip to Bali for the holidays?" spoken by user B.

Then, in a voice analyzing step S402, the analysis unit 202 analyzes the voice received in the voice input receiving step S401. In the first embodiment, the analysis unit 202 identifies a speech start time indicating the time at which a speech starts and a speech time indicating the time period for which the speech is being made (which may be considered as the time for which a voice is continuously input) from the voice received in the voice input receiving step S401. In addition, the analysis unit 202 determines whether the received voice is of the user A. For example, a voice sample of the user A which is registered in the storage unit 206 in advance may be compared with the received voice to determine whether the received voice is of the user. However, the embodiment is not limited thereto. For example, various known determination methods may be used to perform the determination. Then, the analysis unit 202 stores the analysis result in the voice analyzing step S402 in the storage unit 206 (analysis result storage step S403).

More specifically, when receiving a new voice input, the analysis unit 202 registers the time at which the new voice input is detected as the speech start time in voice input history information stored in the storage unit 206. Then, the analysis unit 202 adds to the voice input history information at any time a speech ID for identifying a speech, a speaker ID for identifying a speaker, and the speech time so as to be associated with each other. FIG. 6 is a diagram illustrating an example of voice input history information. The voice input history information is made by sequentially registering the unit information in which the speech ID, the speech start time, the speech time, and the speaker ID are associated with each other. In the first embodiment, the voice input history information may be regarded as voice information indicating the analysis result by the analysis unit 202. In the example illustrated in FIG. 6, information about a voice input corresponding to "Long time no see" illustrated in FIG. 5 which is first spoken by the user A is registered as a first row of the unit information. That is, the speech ID for identifying "Long time no see" illustrated in FIG. 5 which is first spoken by the user A is "1". Then, the speech start time corresponding to the speech ID "1" is "2011/09/08 09:40:50" and corresponds to the time at which the voice input "Long time no see" is received. In addition, the speech time corresponding to speech ID "1" is "5 seconds" and corresponds to the time period for which the voice "Long time no see" is continuously input. Further, the speaker ID corresponding to the speech ID "1" is "0001" and corresponds to the speaker ID of the user A.

In addition, in the example illustrated in FIG. 6, information about a voice input "Did you take a trip to Bali for the holidays?" illustrated in FIG. 5 which is spoken by the user B is registered as a second row of the unit information. That is, the speech ID for identifying "Did you take a trip to Bali for the holidays?" illustrated in FIG. 5 which is spoken by the user B is "2". The speech start time corresponding to the speech ID "2" is "2011/09/08 09:40:57" and corresponds to the time at which the voice input "Did you take a trip to Bali for the holidays?" is received. In addition, the speech time corresponding to the speech ID "2" is "12 seconds" and corresponds to the time period for which the voice "Did you take a trip to Bali for the holidays?" is continuously input. Further, the speaker ID corresponding to the speech ID "2" is "0002" and corresponds to the speaker ID of the speaker (in this case, the user B) other than the user A.

In addition, in the example illustrated in FIG. 6, information about a voice input corresponding to "Yeah, I . . . " illustrated in FIG. 5 which is spoken by the user A is registered as a third row of the unit information. That is, the speech ID for identifying "Yeah, I " illustrated in FIG. 5 which is spoken by the user A is "3". Then, the speech start time corresponding to the speech ID "3" is "2011/09/08 09:41:15" and corresponds to the time at which the voice input "Yeah, I " is received. In addition, the speech time corresponding to the speech ID "3" is "15 seconds" and corresponds to the time period for which the voice "Yeah, I " is continuously input. Further, the speaker ID corresponding to the speech ID "3" is "0001" and corresponds to the speaker ID of the user A. Described above is an example of the detailed content of the voice analyzing step S402 and the analysis result storage step S403 in FIG. 3.

Returning back to FIG. 3, the determination of the current state of the user is periodically performed, separately from the reception of the voice input. That is, the state determining step S404 illustrated in FIG. 3 is performed at a predetermined time interval. In the state determining step S404, the determining unit 203 checks whether the user A or another person makes a speech or the frequency of speech, with reference to the voice input history information stored in the storage unit 206.

In the first embodiment, the determining unit 203 determines whether the user A is "in conversation" on the basis of whether there is a speech (whether a speech starts) and a speech interval indicating the time elapsed from the end of the previous speech. Here, the "in conversation" may be considered as a state in which a speech is repeated at a speech interval equal to or less than a threshold value. That is, the determining unit 203 does not determine that the user is "in conversation" even when the start of the speech is detected and the interval (speech interval) from the previous speech is greater than the threshold value. The determining unit 203 detects the start of the speech and determines that the user is "in conversation" when the speech interval from the next speech is equal to or less than the threshold value.

When it is determined that the user A is not "in conversation", the determining unit 203 can accurately determine the current state (for example, "asleep" or "working (message notification is available)") of the user A on the basis of, for example, the current time, the schedule information of the user A, the position information of the user A, and the like.

Then, in a stored information update step S405, the determining unit 203 registers state information indicating the determination result in the state determining step S404 in the storage unit 206. For example, when it is determined in the state determining step S404 that the user A is "in conversation", the determining unit 203 may store the state information indicating "in conversation" and time information indicating the time at which the determination is performed in the storage unit 206 so as to be associated with each other. In this way, it is possible to know the time when the state of the user A is changed to "in conversation" and the length of the time for which the state "in conversation" is maintained, with reference to the state information stored in the storage unit 206 and corresponding time information.

FIG. 4 is a diagram illustrating an example of the operation of the information notification supporting device 101 when a message from the system body 1001 is received. First, in a message receiving step S501, the communication unit 204 receives a message from the system body 1001. In the first embodiment, it is assumed that a message notifying that the next meeting will start (saying that "the meeting is about to start") illustrated in FIG. 5 is received. In this example, when transmitting a message to the information notification supporting device 101, the system body 1001 gives, to the message, the degree of importance which is determined according to the priority of the message (the priority is an index indicating the priority of the content of the message and increases as the value increases). Therefore, in the message receiving step S501, the communication unit 204 receives the message and the degree of importance of the message from the system body 1001.

In the first embodiment, the above-mentioned degree of importance is classified into three levels "high", "medium", and "low". In addition, the correspondence between the priority and the degree of importance of the message is set in advance. When the priority of the message to be transmitted to the information notification supporting device 101 is equal to or greater than a first reference value, the system body 1001 gives the degree of importance "high" to the message and transmits the message to the information notification supporting device 101. When the priority of the message to be transmitted to the information notification supporting device 101 is less than the first reference value, the system body 1001 gives the degree of importance "medium" or "low" to the message and transmits the message to the information notification supporting device 101. Specifically, when the priority of the message to be transmitted to the information notification supporting device 101 is equal to or greater than a second reference value less than the first reference value, the system body 1001 gives the degree of importance "medium" to the message and transmits the message to the information notification supporting device 101. In addition, when the priority of the message to be transmitted to the information notification supporting device 101 is less than the second reference value, the system body 1001 gives the degree of importance "low" to the message and transmits the message to the information notification supporting device 101.

In this example, since the priority corresponding to the message indicating that the next meeting will start is equal to or greater than the second reference value and less than the first reference value, the degree of importance "medium" is given to the message.

Next, in a message-related information acquiring step S502, the communication control unit 205 acquires information related to the message which is received in the message receiving step S501. More specifically, the communication control unit 205 acquires information, such as the degree of importance given to the received message, a person who transmits a request corresponding to the received message, and a request transmission time indicating the time at which the request corresponding to the received message is transmitted. Then, the communication control unit 205 transmits the acquired information to the determining unit 203.

In the first embodiment, for each process which can be executed by the system body 1001, a voice pattern indicating a request to perform the process and a request to receive the message indicative of the processing result is set in advance. A plurality of voice patterns are registered in the storage unit 206. When at least a portion of the voice input received by the voice input unit 201 is identical to the voice pattern registered in the storage unit 206, a request (an explicit request from the user which is referred to as a "user request") corresponding to the voice pattern is transmitted to the system body 1001. Then, the system body 1001 performs the process corresponding to the received user request and transmits a message indicating the processing result to the information notification supporting device 101. In addition, when the user request is not received from the information notification supporting device 101, but a predetermined time has elapsed with reference to the schedule information of the user A, the system body 1001 transmits the message which will be notified at that time to the information notification supporting device 101. In the first embodiment, the time when the message is notified and the content of the message are set in advance according to the schedule information of the user A.

The message indicating that the next meeting will start which is illustrated in FIG. 5 is not a response to the explicit request ("user request") from the user, but is the message notified by the system body 1001 on the basis of the schedule information of the user A. Therefore, the transmitter of the request corresponding to the message is the "system". In addition, since there is no explicit request from the user, the request transmission time is "nothing".

Returning back to FIG. 4, in a message type determining step S503, the determining unit 203 determines the type of the received message among a plurality of predetermined message types, on the basis of the degree of association between the current state of the user A and the received message and the degree of importance of the received message. More specifically, the determination is performed as follows.

First, a method of determining the degree of association between the current state of the user A and the received message will be described with reference to FIG. 7. In the example illustrated in FIG. 7, in Step S701, the determining unit 203 determines whether the received message is a response to the user request. When it is determined that the received message is not a response to the user request (NO in Step S701), the determining unit 203 determines that the received message is transmitted from the system body 1001 and is not associated with the current state of the user A (Step S702). In this case, the degree of association between the current state of the user A and the received message is set to "absent" indicating that the current state of the user A is not associated with the received message.

On the other hand, when it is determined that the received message is a response to the user request (YES in Step S701), the determining unit 203 determines whether the user request is made in the current state of the user A (Step S703). More specifically, the determining unit 203 determines whether the user request corresponding to the received message is transmitted to the system body 1001 in the current state of the user A indicated by the state information, with reference to the information stored in the storage unit 206. For example, the current state of the user A is "in conversation" and the explicit request from the user during conversation is likely to be associated with the content of the current conversation. Therefore, when the user request corresponding to the received message is transmitted to the system body 1001 in the current state of the user A (YES in Step S703), the determining unit 203 determines that the received message is associated with the current state of the user A (Step S704). In this case, the degree of association between the current state of the user A (the current state of the user A indicated by the state information) and the received message is set to "present" indicating that the current state of the user A is associated with the received message. On the other hand, when the user request corresponding to the received message is not transmitted to the system body 1001 in the current state of the user A (NO in Step S703), the determining unit 203 determines that the received message is not associated with the current state of the user A (Step S702).

Figures 7, 8:
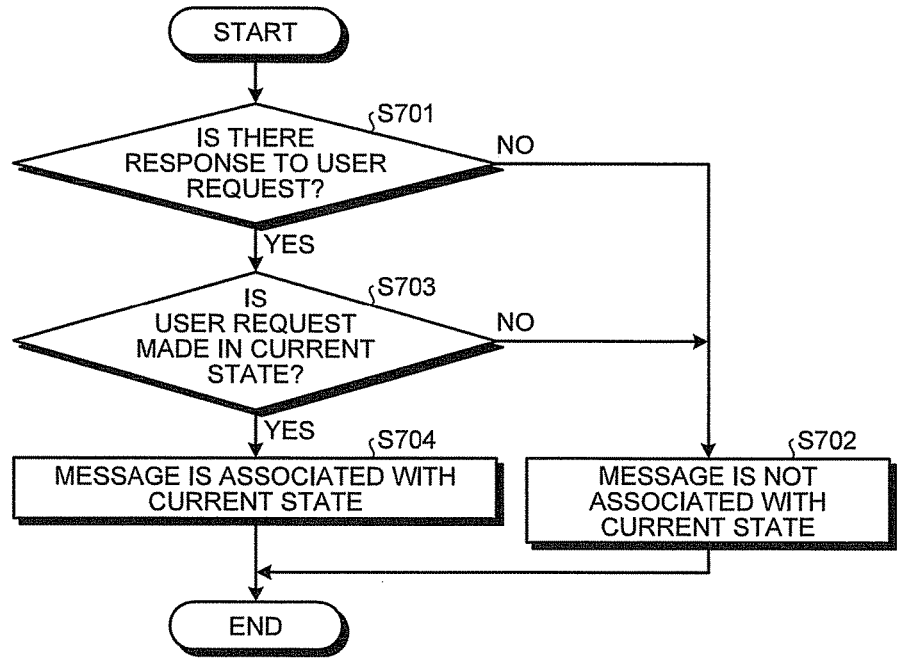
FIG. 7 is a flowchart illustrating an example of a determination method performed by a determining unit according to the first embodiment.
FIG. 8 is a diagram illustrating an example of a determination table according to the first embodiment.

Since the message indicating that the next meeting will start which is illustrated in FIG. 5 is not a response to the user request, the determination result in Step S701 of FIG. 7 is "NO" and it is determined that the message is not associated with the current state of the user A. The degree of association between the current state of the user A and the received message is set to "absent".

After the degree of association between the current state of the user A and the received message is determined in this way, the determining unit 203 determines the type of the received message among a plurality of predetermined message types, on the basis of the degree of importance of the received message and the degree of association between the current state of the user A and the received message. FIG. 8 is a diagram illustrating an example of a determination table used to classify the message types. The determination table is stored in the storage unit 206. The determining unit 203 determines the type of the received message with reference to the determination table read from the storage unit 206. In the determination table illustrated in FIG. 8, a message type ID for identifying a message type, the degree of importance of a message, the degree of association between the current state of the user A and the received message, a notification sound type for identifying the type of notification sound indicating the reception of a message, and a message output timing for identifying a type of the output timing of a message are associated with each other. As described above, since the degree of importance of the message indicating that the next meeting will start which is illustrated in FIG. 5 is "medium" and the degree of association between the current state of the user A and the received message is "absent", it is determined that the received message has a message type ID "4". Then, the determining unit 203 transmits the determination result in the message type determining step S503 to the communication control unit 205.

Returning back to FIG. 4, in a received message information storage step S504 after the message type determining step S503, the communication control unit 205 records message information about the received message on a received message list stored in the storage unit 206. The message information includes, for example, a message ID for identifying a message, a reception time indicating the time at which a message is received, a request transmitter who transmits a request corresponding to a message, and a message type ID.

FIG. 9 is a diagram illustrating an example of the received message list. The received message list is formed by sequentially registering the unit information in which the message ID, the request transmitter, the request transmission time, the reception time, the message type ID, the content of a message, reception notification indicating whether the reception of a message is notified, and content notification indicating whether the content of a message is notified are associated with each other. In the example illustrated in FIG. 9, the message identified by a message ID "0003" corresponds to the latest message (the message indicating that the next meeting will start which is illustrated in FIG. 5) stored in the received message information storage step S504. The communication control unit 205 notifies the output control unit 207 of the reception of a new message.

Returning back to FIG. 4, a message notification time determining step S505 after the received message information storage step S504 is performed whenever the output control unit 207 receives the notice indicating the reception of a new message from the communication control unit 205 or whenever a predetermined time has elapsed. When receiving the notice indicating the reception of a new message, the output control unit 207 determines the notification sound type and the message output time corresponding to the message type ID (the latest message type ID recorded in the received message list) of the received message, with reference to the determination table illustrated in FIG. 8. When the message notification time determining step S505 starts since a predetermined time has elapsed, the output control unit 207 selects a message with the highest priority from the messages which have not been output in the received message list which is stored in the storage unit 206 and performs processing on the selected message.

In the first embodiment, it is assumed that the message (saying that "the next meeting is about to start") indicating that the next meeting will start which is illustrated in FIG. 5 is received. Therefore, the message type ID of the received message is "4" and the output control unit 207 determines the notification sound type and the message output time corresponding to the message type ID "4" with reference to the determination table illustrated in FIG. 8. In this example, the notification sound type is determined to be "5" and the message output time is determined to be "normal". The notification sound of the notification sound type "5" corresponds to a "beeping" sound illustrated in FIG. 5.

Then, in a message reception notifying step S506 illustrated in FIG. 4, the output control unit 207 causes the reception notifying unit 208 to output the notification sound determined in the message notification time determining step S505. In this example, the output control unit 207 causes the reception notifying unit 208 to out put a notification sound, such as a "beeping" sound, corresponding to the notification sound type "5" which is determined in the message notification time determining step S505. In this way, the notification sound, such as a "beeping" sound, is notified to the user and the user A can recognize the reception of the message. In the first embodiment, the notification sound varies depending on the type of received message (message type ID). In other words, the notification sound varies depending on a combination of the degree of importance of the received message and the degree of association between the current state of the user A and the received message. Therefore, the user A who listens to the notification sound can predict the degree of importance of the received message or the degree of association between the current state of the user A and the received message. In this example, the user A listens to the notification sound, such as a "beeping" sound, corresponding to the notification sound type "5" to recognize the reception of the message which has the degree of importance "medium" and is not associated with the current state. For example, when the user A wants to listen to the received message, the start of the speech may be delayed a little to ensure the time required to listen to the message and the message may be output. If the user wants to give priority to conversation, conversation may be continuously performed without ensuring the time required to listen to the message. In this way, it is possible to postpone the output of the message.

In a message output step S507 after the message reception notifying step S506, first, the output control unit 207 determines whether the content of the received message can be output. For example, the output control unit 207 determines whether the user A is in the state in which the user A is able to listen to the message, on the basis of the state information stored in the storage unit 206. Specifically, when the current state of the user A indicated by the state information stored in the storage unit 206 is "in conversation", the output control unit 207 may determine that the user A is not in the state in which the user A is able to listen to the message. When the current state of the user A indicated by the state information is other than "in conversation", the output control unit 207 may determine that the user A is in the state in which the user A is able to listen to the message. As described above, the state information indicates the determination result (the determination result by the determining unit 203) based on the voice information stored in the storage unit 206. Therefore, in other words, the output control unit 207 may determine whether the user A is in the state in which the user A is able to listen to the message, using the voice information (on the basis of the voice information) stored in the storage unit 206. When it is determined that the user A is in the state in which the user A is able to listen to the message, the output control unit 207 causes the output unit 209 to output the content of the received message. In this example, the output control unit 207 causes the output unit 209 to output the message (saying that "the next meeting is about to start") indicating that the next meeting will start which is illustrated in FIG. 5.

On the other hand, when it is determined that the user A is not in the state in which the user A is able to listen to the message, the output control unit 207 controls the output time of the received message using the degree of importance of the received message and the degree of association between the current state of the user A and the received message. Specifically, the output control unit 207 performs the processing according to the message output time corresponding to the received message. In the determination table illustrated in FIG. 8, the message output time is classified into three types "priority", "normal", and "delay". The message output time corresponding to the received message is determined according to a combination of the degree of importance of the received message and the degree of association between the current state of the user A and the received message.

As can be seen from FIG. 8, in the first embodiment, when the degree of importance of the received message is "high", that is, when the priority of the message is equal to or greater than the first reference value, the message output time is set to "priority", regardless of the degree of association between the current state of the user A and the received message. When the degree of importance of the received message is "medium" or "low", that is, when the priority of the message is less than the first reference value and the current state of the user A is associated with the received message, the message output time is set to "normal". In addition, when the degree of importance of the received message is "low", that is, the priority of the message is less than the second reference value and the current state of the user A is not associated with the received message, the message output time is set to "delay". However, the embodiment is not limited thereto. A combination of the degree of importance of the received message and the degree of association between the current state of the user A and the received message for determining the message output time may be arbitrarily changed.

In this example, when the degree of importance of the received message is "high", the message output time corresponding to the received message is set to "priority", regardless of the degree of association between the current state of the user A and the received message. However, the embodiment is not limited thereto. For example, when the received message is associated with the current state of the user A, the message output time corresponding to the received message may be set to "priority", regardless of the degree of importance of the received message. That is, when the received message is to be preferentially notified in the current conversation, the message output time corresponding to the message may be set to "priority", and in this case only, a combination of the degree of importance of the received message and the degree of association between the current state of the user A and the received message for determining the message output time may be arbitrarily set. In addition, for example, the message output time corresponding to the received message may be determined according to only one of the degree of importance of the received message and the degree of association between the current state of the user A and the received message. In short, when the user A is not in the state in which the user A is able to listen to the message, the output control unit 207 may control the output time of the message using the degree of importance of the received message, or it may control the message output time using the degree of association between the current state of the user A and the received message.

The message with the message output time "priority" is to be notified to the user A prior to the current conversation. When the message output time corresponding to the received message is set to "priority", the output control unit 207 outputs the content of the received message even when a new speech has started (controls the output unit 209 such that the content of the message is output). That is, in the first embodiment, when it is determined that the user A is not in the state in which the user A is able to listen to the message and the priority of the received message is equal to or greater than the first reference value (the degree of importance of the received message is "high"), the output control unit 207 outputs the message, regardless of the current state of the user. In this case, the content of the message received from the system body 1001 is cut into the conversation and notified to the user A. For example, in the message reception notifying step S506, a notification sound corresponding to the notification sound type "1" indicating the reception of the message prior to the conversation is notified to the user A and information indicating the arrival of the message prior to the current conversation is provided to the conversational partner (for example, the user B) such that the user B is aware of the arrival of the message. In this way, it is possible to avoid the overlap between the conversation and the voice output of the message. For example, the notification sound may be output such that the conversational partner also listens to the notification sound. Alternatively, light may be emitted from a portion of the information notification supporting device 101 of the user A, thereby notifying the conversational partner that the message prior to the current conversation arrives to the user A.

The message with the message output time "normal" is to be notified to the user A during the conversation such that it does not hinder the current conversation. When the message output time corresponding to the received message is "normal", the output control unit 207 delays the output time of the received message (the received message is not instantly output). When the message output time corresponding to the received message is "normal", it is preferable that the output control unit 207 causes the output unit 209 to output the received message before the current state of the user A is changed to another state. That is, when it is determined that the user A is not in the state in which the user A is able to listen to the message, the priority of the received message is less than the first reference value (the degree of importance of the received message is "medium" or "low"), and the current state of the user A is associated with the received message, it is preferable that the output control unit 207 output the message before the current state of the user A is changed to another state. In the first embodiment, the output control unit 207 outputs the received message until a predetermined period of time passes over after a new speech ends (a value less than the threshold value of the speech interval) if another new speech does not start. When another new speech starts until the predetermined period of time passes over after the new speech ends, the output control unit 207 does not output the received message. In the first example, since the message output time corresponding to the received message is "normal", the output control unit 207 causes the output unit 209 to output the message indicating that the next meeting will start (the message saying that "the meeting is about to start") which is illustrated in FIG. 5 during the current conversation.

The message with message output time "delay" is a message which may be notified to the user A after the current conversation ends. That is, the message may be notified to the user A after the current state is changed to the state in which the user A can listen to the message. When the message output time corresponding to the received message is "delay", the output control unit 207 delays the output time of the received message, as compared to when the message output time is "normal". In the first embodiment, when it is determined that the user A is not in the state in which the user can listen to the message, the priority of the message is less than the second reference value (the degree of importance of the received message is "low"), and the current state of the user A is not associated with the received message, the output control unit 207 outputs the received message after the current state is changed to the state in which the user A can listen to the message. Specifically, when the length of the time elapsed from the end of the speech is greater than a threshold value (the threshold value of the speech interval), the output control unit 207 determines that the conversation has ended. In this case, since the current state of the user A is not "in conversation", the output control unit 207 determines that the current state has changed to the state in which the user A can listen to the message and causes the output unit 209 to output the received message.

In a received message information update step S508 after the message output step S507, the output control unit 207 records "reception notification" and "content notification" in the received message list which is stored in the storage unit 206, thereby updating the received message list. In the received message list illustrated in FIG. 9, "OK" indicating that the reception of the message has been notified (the notification sound has been notified) is recorded in a reception notification entry which corresponds to a message ID "0003" for identifying the message indicating that the next meeting will start which is illustrated in FIG. 5. In addition, "OK" indicating that the content of the message has been notified (the content of the message has been output) is recorded in a content notification entry corresponding to the message ID "0003". Further, in the received message list, the message in which "OK" is not recorded in a "reception notification" entry or a "content notification" entry is a timing determination target in the subsequent message notification time determining step S505. A target message is determined according to a predetermined rule.

As described above, in the first embodiment, when a message is received from the system body 1001, first, the output control unit 207 determines whether the user A is in a state in which the user A is able to listen to the message, on the basis of the voice information stored in the storage unit 206. Then, when it is determined that the user A is in the state in which the user A is able to listen to the message, the output control unit 207 instantly outputs the received message. Therefore, it is possible to notify the user A of the message at an appropriate time, as compared to a structure in which the received message is not output until a waiting time elapses, regardless of the current state of the user A.

On the other hand, when it is determined that the user A is not in the stat in which the user A is able to listen to the message, the output control unit 207 causes the output unit 209 to output the received message according to the message output time which is set depending on the degree of importance of the received message and the degree of association between the current state of the user A and the received message. For example, when the message output time corresponding to the received message is set to "priority" indicating that the message is output prior to the current conversation, the output control unit 207 instantly outputs the received message, regardless of the current state of the user A. For example, when the message output time corresponding to the received message is set to "normal" or "delay" indicating that the output of the message may be delayed, the output control unit 207 delays the output time of the received message. That is, in the first embodiment, the output time of the message is variably controlled according to the degree of importance of the received message and the degree of association between the current state of the user A and the received message. In this way, it is possible to appropriately control the time when the received message is notified to the user.

Second Embodiment

Next, a second embodiment will be described. The second embodiment differs from the first embodiment in that a voice recognition process is performed on a voice received by a voice input unit 201 to obtain text, thereby accurately determining whether a received message from a system body 1001 is associated with the current state of a user A. Hereinafter, the description is focused on the difference between the first embodiment and the second embodiment. In the second embodiment, components having the same functions as those in the first embodiment are denoted by the same reference numerals and the description thereof will not be repeated.

FIG. 10 is a block diagram illustrating an example of the functional structure of an information notification supporting device according to the second embodiment. As illustrated in FIG. 10, the information notification supporting device differs from that according to the first embodiment in that it further includes a voice recognizing unit 310. The voice recognizing unit 310 performs a voice recognition on the input voice received by the voice input unit 201 to obtain text and registers the text obtained by the voice recognition process in a storage unit 206. For example, the voice recognizing unit 310 may sequentially (in time series) register time information (for example, the time at which a speech starts and the time at which the speech ends) indicating the time when a speech is made with being associated with the text obtained by the voice recognition in the storage unit 206.

It is assumed that the current state of the user A indicated by state information stored in the storage unit 206 is "in conversation". In this case, a determining unit 311 compares the received message with the text which is stored in the storage unit 206 and indicates the content of the current conversation in the message type determining step S503 and determines whether predetermined keywords are identical to each other. When the predetermined keywords are identical to each other, it is determined that the content of the current conversation is associated with the received message.

FIG. 11 is a diagram illustrating an example of a method of determining the degree of association between the received message and the current state of the user A in the determining unit 311. First, a case in which a transmitter of a user request is himself (in this example, the user A) is will be described. As illustrated in FIG. 11, the determining unit 311 determines that the received message is associated with the current state of the user A when the transmitter of the user request is himself, the time when the user request is made (the time when the user request is transmitted to the system body 1001) is in the current state of the user A, and the content of the current conversation is associated with the received message. In addition, the determining unit 311 determines that the received message is not associated with the current state of the user A when the transmitter of the user request is himself, the time when the user request is made is in the current state of the user A, and the content of the current conversation is not associated with the received message.

The determining unit 311 determines that the received message is associated with the current state of the user A when the transmitter of the user request is himself, the time when the user request is made is in a previous state before the current state of the user A, and the content of the current conversation is associated with the received message, as illustrated in FIG. 11. In addition, the determining unit 311 determines that the received message is not associated with the current state of the user A when the transmitter of the user request is himself, the time when the user request is made is in the previous state of the user A, and the content of the current conversation is not associated with the received message.

Next, a case in which the transmitter of the user request is a system (in this example, the system body 1001) will be described. In this case, the time when the user request is made may be regarded as the time when the system body 1001 transmits a message to an information notification supporting device 101 (that is, the time when the information notification supporting device 101 receives the message from the system body 1001). The determining unit 311 determines that the received message is associated with the current state of the user A when the transmitter of the user request is the system, the time when the user request is made is in the current state of the user A, and the content of the current conversation is associated with the received message. In addition, the determining unit 311 determines that the received message is not associated with the current state of the user A when the transmitter of the user request is the system, the time when the user request is made is in the current state of the user A, and the content of the current conversation is not associated with the received message.

The determining unit 311 determines that the received message is associated with the current state of the user A when the transmitter of the user request is the system, the time when the user request is made is in the previous state of the user A, and the content of the current conversation is associated with the received message, as illustrated in FIG. 11. The determining unit 311 determines that the received message is not associated with the current state of the user A when the transmitter of the user request is the system, the time when the user request is made is in the previous state of the user A, and the content of the current conversation is not associated with the received message.

In short, when it is determined that the current state of the user A is "in conversation" and the content of the current conversation is associated with the received message, the determining unit 311 determines that the received message is associated with the current state of the user A.

In the second embodiment, keywords or keyphrases (text), which requests to perform the processing executable by the system body 1001 and requests to transmit a message indicating the processing result, is set in advance for each of the processing. Specifically, text data for a plurality of kinds of keywords (or keyphrases) is registered in the storage unit 206. When at least a portion of the recognition result (the result of the voice recognition by the voice recognizing unit 310) of the input voice received by the voice input unit 201 is identical to the keyword registered in the storage unit 206, a request corresponding to the keyword (an explicit request from the user which is referred to as a "user request") is transmitted to the system body 1001. Then, the system body 1001 performs the processing corresponding to the received user request and transmits a message indicating the processing result to the information notification supporting device.

It is only necessary for the information notification supporting devices according to the embodiments to include at least the analysis unit 202, the determining unit 203, the storage unit 206, the output control unit 207, and the output unit 209 among the above-mentioned functions. For example, the system body includes at least the analysis unit 202, the determining unit 203, the storage unit 206, the output control unit 207, and the output unit 209, so as to function as the information notification supporting device.

The above-mentioned information notification supporting device has a hardware structure including, for example, a CPU (Central Processing Unit), a ROM, a RAM, a communication I/F device, and the like. The voice input unit 201, the communication unit 204, and the storage unit 206 are hardware components. The CPU expands a program stored in the ROM on the RAM and executes the program to implement the functions of the analysis unit 202, the determining unit 203, the communication control unit 205, the output control unit 207, the reception notifying unit 208, and the output unit 209. However, the invention is not limited thereto. At least some of the functions of the analysis unit 202, the determining unit 203, the communication control unit 205, the output control unit 207, the reception notifying unit 208, and the output unit 209 may be implemented by individual circuits (hardware).

The program executed by the information notification supporting device may be stored in a computer which is connected to a network, such as the Internet, downloaded through the network, and then provided. In addition, the program executed by the information notification supporting device may be provided or distributed through the network, such as the Internet. Furthermore, the program executed by the information notification supporting device may be incorporated into, for example, the ROM and then provided.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information notification supporting device comprising:
   a memory configured to store a recognition result of an input voice of a user,
   and processing circuitry coupled to the memory and configured to perform operations, comprising:
   receiving a message;
   determining, using an analysis result, schedule information and position information, whether the user is in a first state or a second state, wherein the first state represents a state in which the user is able to listen to the message and the second state represents a state in which the user is not able to listen to the message;
   and when it is determined that the user is in the second state, determining a degree of association based on a recognition result of the input voice of the user and the received message, the degree of association indicating whether the message is associated with a current state of the user,
   and controlling a timing to output the received message via the information notification supporting device using the determined degree of association, a degree of importance that is determined according to a priority of the received message, and correspondence information in which the degree of association; the degree of importance, and the timing to output the message are associated with each other.

2. The device according to claim 1, wherein the controlling includes, when it is determined that the user is in the first state, performing control so that the message is output.

3. The device according claim 1, wherein
   the processing circuitry is configured to perform the operations, further comprising determining whether the message is associated with the recognition result according to whether a keyword of the message is identical to a keyword of the recognition result.

4. The device according claim 1, wherein the processing circuitry is configured to perform the operations, further comprising performing voice recognition of the input voice.

5. The device according claim 1, wherein the receiving includes receiving the message via wireless communication.

6. The device according claim 1, further comprising a microphone configured to acquire the input voice.

7. The device according to claim 1, wherein the processing circuitry is further configured to perform the operations, further comprising analyzing the input voice so as to identify the voice information.

8. An information notification supporting method comprising:
   receiving a message;
   determining, using an analysis result, schedule information and position information, whether the user is in a first state or a second state; wherein the first state represents a state in which the user is able to listen to the message and the second state represents a state in which the user is not able to listen to the message;
   and when it is determined that the user is in the second state, determining a degree of association based on a recognition result of the input voice of the user and the received message, the degree of association indicating whether the message is associated with a current state of the user,
   and controlling a timing to output the received message via an information notification supporting device using the determined degree of association, a degree of importance that is determined according to a priority of the received message, and correspondence information in which the degree of association, the degree of importance, and the timing to output the message are associated with each other.

9. The method according to claim 8, wherein the controlling includes, when it is determined that the user is in the first state, performing control so that the message is output.

10. The method according claim 8, further comprising determining whether the message is associated with the recognition result according to whether a keyword of the message is identical to a keyword of the recognition result.

11. The method according claim 8, further comprising performing voice recognition of the input voice.

12. The method according claim 8, wherein the receiving includes receiving the message via wireless communication.

13. The method according to claim 8, further comprising analyzing the input voice so as to identify the voice information.

14. An information notification supporting device comprising:
   a memory configured to store a message for a user;
   and processing circuitry coupled to the memory and configured to perform operations, comprising:
   receiving a message;
   determining, using an analysis result, schedule information and position information, whether the user is in a first state or a second state, wherein the first state represents a state in which the user is able to listen to the message and the second state represents a state in which the user is not able to listen to the message;
   and when it is determined that the user is in the second state, determining a degree of association based on a recognition result of the input voice of the user and the received message, the degree of association indicating whether the message is associated with a current state of the user,
   and controlling a timing to output the received message via the information notification supporting device using the determined degree of association, a degree of importance that is determined according to a priority of the received message, and correspondence information in which the degree of association, the degree of importance, and the timing to output the message are associated with each other.

15. The device according to claim 14, wherein
   the controlling includes, when it is determined that the user is in the second state and when the priority of the message received is equal to or greater than a first reference value, performing control so that the message is output.

16. The device according to claim 14, further comprising a microphone configured to acquire input voice.

* * * * *